United States Patent [19]
Knowlton et al.

[11] Patent Number: 5,780,768
[45] Date of Patent: Jul. 14, 1998

[54] GAS GENERATING COMPOSITIONS

[75] Inventors: Gregory D. Knowlton, Chandler; Christopher P. Ludwig, Scottsdale; Daniel Haun, Chandler, all of Ariz.

[73] Assignee: Talley Defense Systems, Inc., Mesa, Ariz.

[21] Appl. No.: 706,198

[22] Filed: Aug. 30, 1996

Related U.S. Application Data

[63] Continuation-in-part of Ser. No. 402,103, Mar. 10, 1995, Pat. No. 5,551,725.

[51] Int. Cl.$^6$ .......................... C06B 42/08; C06B 31/00; C06B 31/12; C06B 29/16
[52] U.S. Cl. .................. 149/36; 149/45; 149/62; 149/78; 149/83; 149/76; 149/92
[58] Field of Search ................. 149/19.1, 19.7, 149/45, 67, 61, 62, 70, 36.76, 78.83, 92, 88, 120, 190.2

[56] References Cited

U.S. PATENT DOCUMENTS

| | | | |
|---|---|---|---|
| Re. 32,584 | 1/1988 | Pietz | 423/351 |
| 3,883,373 | 5/1975 | Sidebottan | 149/6 |
| 4,632,714 | 12/1986 | Abegg et al. | 149/2 |
| 4,673,527 | 6/1987 | Goudy, Jr. et al. | 252/181 |
| 4,812,308 | 3/1989 | Winston et al. | 424/52 |
| 4,865,635 | 9/1989 | Cuevas | 55/276 |
| 4,907,819 | 3/1990 | Cuevas | 280/736 |
| 4,923,212 | 5/1990 | Cuevas | 280/736 |
| 5,401,340 | 3/1995 | Doll et al. | 149/22 |
| 5,411,615 | 5/1995 | Sumrail et al. | 149/47 |
| 5,429,691 | 7/1995 | Hinshaw et al. | 149/45 |
| 5,439,537 | 8/1995 | Hinshaw et al. | 149/22 |
| 5,500,059 | 3/1996 | Lund et al. | 149/19.1 |
| 5,501,823 | 3/1996 | Lund et al. | 264/3.1 |
| 5,531,941 | 7/1996 | Poole | 264/3.4 |
| 5,538,567 | 7/1996 | Henry, III et al. | 149/18 |
| 5,545,272 | 8/1996 | Poole et al. | 149/48 |
| 5,551,725 | 9/1996 | Ludwig | 280/737 |
| 5,641,938 | 6/1997 | Holland et al. | 149/48 |

*Primary Examiner*—Joseph D. Anthony
*Attorney, Agent, or Firm*—Pennie & Edmonds LLP

[57] ABSTRACT

A low-solids gas generating composition, comprising a mixture of a fuel selected for the group consisting of guanidine nitrate, nitroguanidine, cellulose, cellulose acetate, hexamine, and mixtures thereof, and an oxidizer selected from the group consisting of ceric ammonium nitrate, lithium nitrate, lithium perchlorate, sodium perchlorate, phase stabilized ammonium nitrate, a combination of ammonium nitrate with potassium nitrate, potassium perchlorate, or mixtures thereof, such that the combination is a solid solution, a mixture of ammonium perchlorate and at least one alkali metal salt, and mixtures thereof, where the fuel is not nitroguanidine when the oxidizer includes ammonium nitrate. The combination of ammonium nitrate with other salts in solid solution is intended to phase stabilize the ammonium nitrate. The oxidizer-fuel mixture is within about 4 percent of stoichiometric balance. Useful alkali metal salts include lithium carbonate, lithium nitrate, sodium nitrate, potassium nitrate, and mixtures thereof. The preferred oxidizers for the gas generating composition of the invention are ceric ammonium nitrate, lithium nitrate, lithium perchlorate, sodium perchlorate, a mixture of ammonium perchlorate and at least one alkali metal salt, and mixtures thereof. The preferred fuels are guanidine nitrate, nitroguanidine, and mixtures thereof. In addition, the gas generating composition may include an energizing agent, such as RDX or HMX. The gas generating composition of the invention may further comprise sub-micron fumed silica to reduce moisture contamination and serve as a processing and powder flow aid and/or a binder, and may be in the form of pressed pellets, grains, or granules.

43 Claims, 1 Drawing Sheet

GAS GENERATING COMPOSITIONS

This application is a continuation-in-part of U.S. application Ser. No. 08/402,103, filed Mar. 10, 1995, now U.S. Pat. No. 5,551,725.

FIELD OF THE INVENTION

The invention generally relates to gas generating compositions or gas generants, such as those used in "air bag" passive restraint systems. In particular, the invention relates to non-azide gas generants having a low solids output on combustion.

BACKGROUND OF THE INVENTION

The inflator in a vehicle air bag passive restraint system provides the gas required to deploy and fill the air bag in a matter of milliseconds when an actuation signal is received by the system. The air bag inflator must perform properly during an accident at any point in the useful life of the vehicle. The fact that an inflator may be required to rapidly fill an air bag after 10 or more years of storage places a number of constraints on inflator design, which are dictated by the required performance of the restraint system, i.e., the time required for the full deployment of the air bag, reliability (including environmental exposure and storage life), the safety and health of vehicle occupants, air bag volume, and the interface between the restraint system and the vehicle. The inflator specification that results from these constraints defines the form, fit, and function criteria for the inflator.

The restraint system performance is dictated, in part, by the need to fill and deploy the air bag in a matter of milliseconds. Under representative conditions, only about 60 milliseconds elapse between the primary impact of a vehicle in an accident and the secondary impact of the driver or passenger (herein after "an occupant") with a portion of the vehicle interior. Therefore, a very rapid generation or release of gas is required to fill the bag, and prevent the secondary impact. The amount and rate of gas generation or release is determined by the volume of the air bag required for the vehicle and the time between primary and secondary impacts.

In addition, to meet environmental and occupant safety and health requirements, the inflation gas produced by the inflator should be non-toxic and non-noxious when the inflator is functioned in an air bag module in a typical vehicle. The gas generated or released must also have a temperature that is sufficiently low to avoid burning the occupant and the air bag, and it must be chemically inert, so that the mechanical strength and integrity of the bag are not degraded by the gas.

The stability and reliability of an inflator gas generant over the life of the vehicle are extremely important. The gas generant must be stable over a wide range of temperature and humidity conditions, and should be resistant to shock, so that the propellant pellets, grains, granules, etc. maintain mechanical strength and integrity during the life of the vehicle.

Vehicle manufacturers have developed a number of quantitative tests to determine whether an air bag restraint system will operate reliably when needed during any part of a vehicle's useful life. Although these tests and the performance requirements that an inflator should meet in these tests vary somewhat from manufacturer to manufacturer, the design criteria of all the vehicle manufacturers are essentially the same.

In a typical prior art passive restraint system the inflation gas is nitrogen, which is produced by the decomposition reaction of a gas generant containing a metal azide, typically sodium azide ($NaN_3$). The metal azide is the fuel and the principal gas generating compound in the gas generant used in the inflator. A typical metal azide gas generant is disclosed in U.S. Reissue Pat. No. Re. 32,584.

The gas produced in sodium azide based inflators is all nitrogen. Because there is no carbon in the fuel, oxides of nitrogen, $NO_x$, can be controlled easily by running the propellant under slightly fuel rich conditions. In contrast, the combustion of gas generants containing carbon, nitrogen, and oxygen, when formulated to be fuel rich, results in the production of carbon monoxide (CO), a toxic gas. If excess oxygen is present in such a composition to assure the complete oxidation of CO to carbon dioxide, the excess oxygen will react with nitrogen at the propellant combustion temperature to form oxides of nitrogen, which can also be toxic. Therefore, the mixture of oxidizer and fuel must approach a stoichiometric balance in gas generants of this type to avoid the production of toxic gases.

Inflator designs based on sodium azide have been shown to meet the requirements of vehicle manufacturers, and are used today in most passive restraint systems. However, there are disadvantages to this technology, including the production of large quantities of hot, solid particulates during combustion, which results in added complexity and cost in the inflator design. The relatively high toxicity of the raw sodium azide (oral rat $LD_{50}$ of about 45 mg/kg), which must be handled during the inflator manufacturing process, can also create a disposal problem at the end of the useful life of the vehicle. Because typical gas generants used in inflators produce solid particulates, filters must be incorporated into the inflator to separate the hot particulates from the gas prior to exhausting the gas from the inflator into the air bag. Filters are required in virtually all driver and passenger side air bag inflators that incorporate purely pyrotechnic gas generants, including sodium azide based air bag inflators. The solids produced during the combustion of the gas generant are separated from the gas stream to prevent exposure of vehicle occupants to excessive or toxic levels of airborne particulates during and after air bag deployment. The need for filters, as well as the toxicity of the sodium azide, adds to the cost of producing a typical prior art inflator.

Pyrotechnic compositions typically comprise a fuel and an oxidizer or, in the case of monopropellants, such as nitrocellulose, a fuel having an integral oxidizer. Most pyrotechnic oxidizers produce significant amounts of solids in the process of decomposing to provide an oxidizing agent, such as oxygen.. As it is important to provide an inflator gas having a temperature sufficiently low to avoid burning the air bag or the vehicle occupants, gas generants that burn faster and better at lower temperatures, but tend to produce significant quantities of particulates, are often utilized in air bag inflators.

Oxidizers that produce low amounts of particulates during the combustion of a gas generant are available, but often produce toxic byproducts. For example, gas generants that use ammonium perchlorate as the sole oxidizer typically burn rapidly without producing large amounts of solid particulates. However, ammonium perchlorate produces large quantities of hydrogen chloride (HCl) during combustion, and exceeds the toxicity limits placed on an inflator gas for a vehicle air bag. Thus, gas generants containing ammonium perchlorate cannot be used in vehicle passive restraint systems without some means of trapping or neutralizing the HCl produced during combustion.

"Hybrid" inflators that use stored pressurized gas for part of the inflator gas supply are another means used to control solid particulate production, since smaller amounts of solid particulate producing gas generant can be used to obtain the same inflator gas output. In addition, the stored pressurized gas, which is typically an inert gas mixed with oxygen to supplement combustion and decrease the level of toxics, cools the gas that flows from the inflator, and results in a greater degree of condensation and solidification within the inflator. Thus, the amount of particulates introduced into the air bag and the vehicle interior is reduced.

The combination of greater condensation of solids within the inflator and the reduction in the total amount of solids produced eliminates the need for filters in hybrid inflators. However, hybrid inflators have two main disadvantages: 1. They are typically larger and heavier, and 2. They have decreased reliability resulting from storing a pressurized gas over the lifetime of the vehicle.

U.S. Pat. No. 5,538,567 discloses a gas generating propellant, which produces nitrogen, carbon dioxide, and steam on combustion, consisting essentially of guanidine nitrate, a flow enhancer, such as carbon black, a binder, such as calcium resinate, and an oxidizer selected from the group consisting of potassium perchlorate and ammonium perchlorate. The production of only nitrogen, carbon dioxide, steam, and minor amounts of hydrogen and carbon monoxide is disclosed. However, only a single composition comprising potassium perchlorate is exemplified. There is no example of compositions incorporating ammonium perchlorate, which produces significant quantities of hydrogen chloride (HCl) during combustion.

U.S. Pat. No. 5,545,272 discloses a gas generating composition consisting essentially of about 35 to 55 percent by weight nitroguanidine and about 45 to 65 percent by weight phase stabilized ammonium nitrate, and may include a flow enhancer or a molding facilitator. The phase stabilizer is typically a potassium salt. Although ammonium nitrate produces clean non-toxic gases, and is free of solids upon combustion, ammonium nitrate has a crystal transition or phase stability problem, resulting from the four phase transitions ammonium nitrate crystals undergo over the temperature range typically experienced in storage. Each of these transitions results in a change of crystal volume, which may cause a slow breakup of propellant grains during thermal cycling from high to low temperature. However, ammonium nitrate crystals can be "phase stabilized" using additives, such as potassium perchlorate and potassium nitrate. The effectiveness of these additives varies depending upon the particular additive used. However, most of the known additives useful as phase stabilizers produce solids upon combustion, and, thus, increase the production of solids by the propellant.

The present invention is directed to low solids producing gas generants that minimize or eliminate the need for inflator filters or other means for separating solids from the gases produced.

SUMMARY OF THE INVENTION

The present invention relates to a low-solids gas generating composition, comprising a mixture of a fuel selected from the group consisting of guanidine nitrate, nitroguanidine, cellulose, cellulose acetate, hexamine, and mixtures thereof, and an oxidizer selected from the group consisting of ceric ammonium nitrate, lithium nitrate, lithium perchlorate, sodium perchlorate, phased stabilized ammonium nitrate, a combination of ammonium nitrate with potassium nitrate, potassium perchlorate, or mixtures thereof, such that the combination is a solid solution, a mixture of ammonium perchlorate and at least one alkali metal salt, and mixtures thereof, where the fuel is not nitroguanidine when the oxidizer comprises ammonium nitrate. The oxidizer-fuel mixture is within about 4 percent of stoichiometric balance, and produces low solids on combustion. Useful alkali metal salts include lithium carbonate, lithium nitrate, sodium nitrate, potassium nitrate, and mixtures thereof. The combination of ammonium nitrate with other salts in solid solution is intended to phase stabilize the ammonium nitrate.

The preferred oxidizers for the gas generating composition of the invention are ceric ammonium nitrate, lithium nitrate, lithium perchlorate, sodium perchlorate, a combination of ammonium nitrate with potassium nitrate, potassium perchlorate, or mixtures thereof, such that the combination is a solid solution, a mixture of ammonium perchlorate and at least one alkali metal salt, and mixtures thereof. The most preferred fuels are guanidine nitrate, nitroguanidine, and mixtures thereof. However, other preferred compositions use cellulose, cellulose acetate, hexamine, and mixtures thereof as fuels.

In addition, the gas generating composition may include an energizing agent, such as hexahydro-1,3,5-trinitro-1,3,5-triazine (RDX) or octahydro-1,3,5,7-tetranitro-1,3,5,7-tetraazocine (HMX). The gas generating composition of the invention may further comprise a sub-micron (i.e., having an average particle size of less than about 1 μm) fumed silica, such as Cabosil®, to reduce moisture contamination and serve as a processing and powder flow aid. The compositions of the invention may be in the form of pressed pellets, grains, granules, or powder, and may also include a binder.

The preferred gas generating compositions of the invention include the following mixtures:

Guanidine nitrate and an oxidizer comprising a combination of ammonium nitrate and potassium perchlorate, and sub-micron fumed silica; more preferably, from about 45 to about 54 percent guanidine nitrate, from about 26 to about 52 percent ammonium nitrate, and from about 3 to about 20 percent potassium perchlorate; most preferably, about 50 percent guanidine nitrate, about 39 percent ammonium nitrate, and about 11 percent potassium perchlorate.

Guanidine nitrate and a combination of ammonium nitrate and potassium nitrate; more preferably from about 37 to about 46 percent guanidine nitrate, from about 34 to about 60 percent ammonium nitrate, and from about 3 to about 20 percent potassium nitrate; most preferably about 46 percent guanidine nitrate, about 49 percent ammonium nitrate, and about 6 percent potassium nitrate.

Guanidine nitrate and an oxidizer comprising a mixture of ammonium perchlorate and sodium nitrate; more preferably from about 54 to about 67 percent guanidine nitrate and from about 33 to about 46 percent oxidizer, wherein the oxidizer comprises ammonium perchlorate and sodium nitrate in a mole ratio of about 1 mole of ammonium perchlorate to about 1 to about 4 moles of sodium nitrate; most preferably, about 59 percent guanidine nitrate, about 23 percent ammonium perchlorate, and about 18 percent sodium nitrate.

Guanidine nitrate and an oxidizer comprising a mixture of ammonium perchlorate and lithium carbonate; more preferably, from about 41 to about 57 percent guanidine nitrate and from about 43 to about 59 percent oxidizer, wherein the oxidizer comprises ammonium perchlorate and lithium carbonate in a mole ratio of about 1 mole of ammonium perchlorate to about 1 to about 1.4 moles of lithium carbonate; most preferably; about 47 percent guanidine nitrate, about 40 percent ammonium perchlorate, and about 13 percent lithium carbonate.

Guanidine nitrate and an oxidizer comprising a mixture of ammonium perchlorate and lithium nitrate; more preferably, from about 56 to about 68 percent guanidine nitrate and from about 32 to about 44 percent oxidizer, wherein the oxidizer comprises ammonium perchlorate and lithium nitrate in a mole ratio of about 1 mole of ammonium perchlorate to about 1 to about 8 moles of lithium nitrate; most preferably, about 61 percent guanidine nitrate, about 24 percent ammonium perchlorate, and about 15 percent lithium nitrate.

Guanidine nitrate and an oxidizer comprising a mixture of ammonium perchlorate and potassium nitrate; more preferably, from about 50 to about 64 percent guanidine nitrate and from about 36 to about 50 percent oxidizer, wherein the oxidizer comprises ammonium perchlorate and potassium nitrate in a mole ratio of about 1 mole of ammonium perchlorate to about 1 to about 2 moles of potassium nitrate; most preferably, about 57 percent guanidine nitrate, about 23 percent ammonium perchlorate, and about 20 percent potassium nitrate.

Guanidine nitrate and ceric ammonium nitrate; more preferably, from about 51 to about 65 percent guanidine nitrate and from about 35 to about 49 percent ceric ammonium nitrate; most preferably, about 56 percent guanidine nitrate and about 44 percent ceric ammonium nitrate.

Guanidine nitrate and lithium nitrate; more preferably, from about 61 to about 70 percent guanidine nitrate and from about 30 to about 39 percent lithium nitrate; most preferably, about 68 percent guanidine nitrate and about 32 percent lithium nitrate.

Guanidine nitrate and lithium perchlorate; more preferably, from about 65 to about 75 percent guanidine nitrate and from about 25 to about 35 percent lithium perchlorate; most preferably, about 68 percent guanidine nitrate and about 32 percent lithium perchlorate.

Nitroguanidine and an oxidizer comprising a mixture of ammonium perchlorate and lithium carbonate; more preferably, from about 38 to about 53 percent nitroguanidine and from about 47 to about 62 percent oxidizer, wherein the oxidizer comprises ammonium perchlorate and lithium carbonate in a mole ratio of about 1 mole of ammonium perchlorate to about 1 to about 1.3 moles of lithium carbonate; most preferably, about 44 percent nitroguanidine, about 42 percent ammonium perchlorate, and about 14 percent lithium carbonate.

Nitroguanidine and an oxidizer comprising a mixture of ammonium perchlorate and sodium nitrate; more preferably, from about 50 to about 62 percent nitroguanidine, and from about 38 to about 50 percent oxidizer, wherein the oxidizer comprises ammonium perchlorate and sodium nitrate in a mole ratio of about 1 mole of ammonium perchlorate to about 1 to about 3 moles of sodium nitrate; most preferably, about 55 percent nitroguanidine, about 26 percent ammonium perchlorate, and about 19 percent sodium nitrate.

Nitroguanidine and lithium perchlorate; more preferably, from about 62 to about 71 percent nitroguanidine, and from about 29 to about 38 percent lithium perchlorate; most preferably, about 65 percent nitroguanidine and about 35 percent lithium perchlorate.

Nitroguanidine and ceric ammonium nitrate; more preferably, from about 48 to about 61 percent nitroguanidine and from about 39 to about 52 percent ceric ammonium nitrate; most preferably, about 53 percent nitroguanidine and about 47 percent ceric ammonium nitrate.

Cellulose and an oxidizer comprising a mixture of ammonium perchlorate and sodium nitrate; more preferably, from about 22 to about 28 percent cellulose and from about 72 to about 78 percent oxidizer, wherein the oxidizer comprises ammonium perchlorate and sodium nitrate in a mole ratio of about 1 mole of ammonium perchlorate to about 1 to about 4 moles of sodium nitrate; most preferably, about 24 percent cellulose, about 43 percent ammonium perchlorate, and about 33 percent sodium nitrate.

Hexamine and an oxidizer comprising a mixture of ammonium perchlorate and sodium nitrate; more preferably, from about 14 to about 18 percent hexamine and from about 82 to about 86 percent oxidizer, wherein the oxidizer comprises ammonium perchlorate and sodium nitrate in a mole ratio of about 1 mole of ammonium perchlorate to about 1 to about 4 moles of sodium nitrate; most preferably, about 16 percent hexamine, about 48 percent ammonium perchlorate, and about 36 percent sodium nitrate.

Cellulose acetate and an oxidizer comprising a mixture of ammonium perchlorate and sodium nitrate; more preferably, from about 20 to about 25 percent cellulose acetate and from about 75 to about 80 percent oxidizer, wherein the oxidizer comprises ammonium perchlorate and sodium nitrate in a mole ratio of about 1 mole of ammonium perchlorate to about 1 to about 4 moles of sodium nitrate; most preferably, about 22 percent cellulose acetate, about 44 percent ammonium perchlorate, and about 34 percent sodium nitrate.

Guanidine nitrate, RDX and/or HMX, and an oxidizer comprising a mixture of ammonium perchlorate and sodium nitrate; from about 12 to about 52 percent guanidine nitrate, from about 15 to about 45 percent RDX and/or HMX, and from about 31 to about 45 percent oxidizer, wherein the oxidizer comprises ammonium perchlorate and sodium nitrate in a mole ratio of about 1 mole of ammonium perchlorate to about 1 to about 4 moles of sodium nitrate; most preferably, about 30 percent guanidine nitrate, about 32 percent RDX and/or HMX, about 21 percent ammonium perchlorate, and about 17 percent sodium nitrate.

DETAILED DESCRIPTION OF THE PREFERRED EMBODIMENTS

Figure 1:
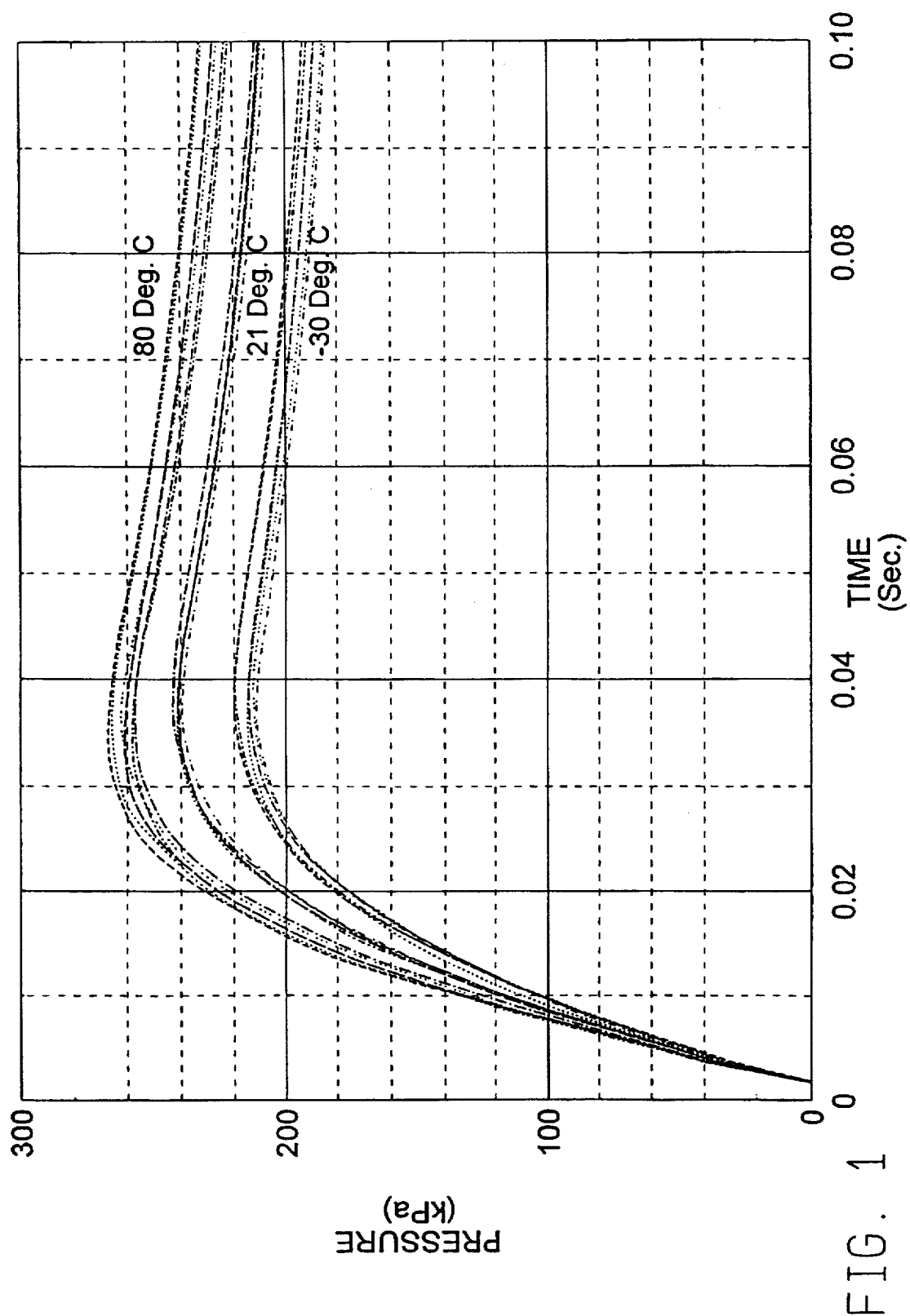
FIG. 1 is a graph of the results of a 60 liter closed tank performance test of an inflator incorporating gas generant compositions as described in the Example.

Unless otherwise stated, all references to "percent" or "%" mean percent by weight based on the total weight of the composition.

As used herein, the term "stoichiometric balance" means that the ratio of oxidizer to fuel is such that upon combustion of the composition all of the fuel is fully oxidized, and no excess of oxygen is produced. A "near stoichiometric balance" is one in which the ratio of oxygen mass surplus or deficit to total mixture mass is within about 4 percent of a stoichiometric balance.

As used herein, the terms "low solids" and "low levels of solids" mean that, upon combustion, the gas generant produces substantially lower solids than gas generants used in prior art pyrotechnic inflators, such as sodium azide based inflators, which produce about 60 percent solids on combustion. The gas generants of the invention typically produce less than about 30 percent solids. This is advantageous in that it minimizes or eliminates the need for a filter in the inflator, thus, simplifying inflator design.

The compositions of the invention are low solids producing gas generants. Preferred embodiments of the invention are well suited as non-azide gas generants for use in filterless vehicle air bag inflators, that is, gas generants that do not require a metal azide as a necessary component. The compositions disclosed herein produce low levels of solids during combustion, and minimize or eliminate the need for filters or hybrid operation.

An example of a filterless inflator is provided in parent U.S. application Ser. No. 08/402,103, which is incorporated herein by reference. The inflator described in the above identified application comprises a contained volume, a source of gas for producing an inflation gas, an initiating system for initiating the conversion of the source of gas to the inflation gas, and an exhaust orifice that provides an exhaust path and controls the flow of the inflation gas. The source of gas is typically a mixture of a fuel and oxidizer that is stable, and will not ignite until the initiating system ignites the mixture to produce the inflation gas.

A typical inflator functions by converting an electrical or mechanical initiating signal into the generation of a precisely controlled quantity of gas at precisely controlled rates. Generally, this is accomplished by an inflator pyrotechnic train, which comprises an 'initiation' device called an initiator, an enhancer charge, and a main gas generant charge, all of which are contained in the body of the inflator. In response to the initiating signal, the initiator ignites and produces a hot gas, particulates, and/or flame. The flame output of the initiator is typically small, and often requires enhancement to ignite the main gas generant charge. The initiator flame ignites the enhancer charge, which is a hot burning propellant, and augments the initiator output sufficiently to ignite the main gas generant charge. Once ignited, the gas generant burns to produce the hot gas required at a rate sufficient to fill the air bag module in the required time.

Propellant compositions according to the invention are useful as both enhancers and gas generants. The claimed compositions provide a relatively clean gas that meets the requirements of the automotive air bag market, and produce entrained solids in a quantity that is sufficiently low so as to not require the use of filters or supplemental stored gas. Although it is desirable in many applications for both the gas generant and the enhancer to have a low solids output during combustion, it is particularly important for the gas generant, which is the principal source of gas for the inflator output.

The fuels of the invention, guanidine nitrate, $CH_6N_4O_3$, nitroguanidine, $CH_4N_4O_2$, hexamethylene tetramine (hexamine), cellulose, and cellulose acetate, are hydrocarbons, containing only carbon, hydrogen, oxygen, and nitrogen. These fuels provide clean combustion products when properly mixed with an appropriate oxidizer. Most oxidizers used in the air bag industry produce significant quantities of solids. Therefore, the amount of solids produced by the combustion of the generant compositions of the invention is determined by the amount of oxidizer in the propellant. Guanidine nitrate and nitroguanidine require a minimum quantity of oxidizer, and thus, produce low solids on combustion. Additionally, hexamethylene tetramine (hexamine), cellulose, and cellulose acetate, are energetic fuels, which, when used in enhancer mixtures, produce sufficiently low quantities of solids to allow their use in filterless inflators.

Oxidizers useful in the invention that produce low solids are ceric ammonium nitrate, lithium nitrate, lithium perchlorate, sodium perchlorate, phase stabilized ammonium nitrate, a combination of ammonium nitrate with potassium nitrate, potassium perchlorate, or mixtures thereof, such that the combination is a solid solution, a mixture of ammonium perchlorate and at least one alkali metal salt, and mixtures thereof, where the fuel is not nitroguanidine when the oxidizer comprises ammonium nitrate. The combination of ammonium nitrate with other salts in solid solution is intended to phase stabilize the ammonium nitrate. The preferred oxidizers are ceric ammonium nitrate, lithium nitrate, lithium perchlorate, sodium perchlorate, a mixture of ammonium perchlorate and at least one alkali metal salt, and mixtures thereof.

With an ammonium perchlorate oxidizer, a highly alkaline material must be produced during combustion of the gas generant to neutralize or scavenge HCl produced during combustion. The alkali metal salts of the invention, $Li_2CO_3$, $LiNO_3$, $NaNO_3$, and $KNO_3$, burn to form the corresponding alkali metal oxides (i.e.: $Li_2O$, $Na_2O$, and $K_2O$), which, in turn, being extremely alkaline, react with the HCl to form the alkali metal chloride and water. The metal oxides produced by the combustion of salts of metals other than the group IA alkali metals are typically not basic enough to effectively scavenge HCl. Alkali metal salts are used with an ammonium perchlorate oxidizer in the compositions of the invention to meet representative gas toxicity requirements. As one of ordinary skill in the art will recognize, an ammonium perchlorate based oxidizer system can use a single alkali metal salt or multiple alkali metal salts mixed in any proportion, as long as the total amount of alkali metal oxide produced during combustion is at least sufficient to scavenge all of the HCl produced. One of ordinary skill in the art will also recognize that an excess amount of salt can be utilized, as long as the resulting composition is low solids producing.

The preferred guanidine nitrate and nitroguanidine gas generant fuels and the enhancer fuels of nitroguanidine, hexamethylene tetramine (hexamine), cellulose, cellulose acetate, or guanidine nitrate, mixed with at least one of RDX and/or HMX, require a minimum amount of oxidizer, thus reducing solids production. With the appropriate choice of an oxidizer, the preferred fuels provide gas generants and enhancers that produce low solids during combustion.

For a particular fuel, a broad range of operating temperatures can be obtained by varying the oxidizer used, while maintaining a near stoichiometric balance between the fuel and oxidizer. The sodium and lithium perchlorate oxidizers provide gas generants with the highest flame temperatures, while the combination of ammonium perchlorate and lithium carbonate gives the lowest flame temperature with a particular fuel. The ammonium perchlorate/sodium nitrate system provides a flame temperature somewhere between these other systems, and, of the low hygroscopicity oxidizer systems, also provides gas generants with the lowest solids. This system provides a combination of low solids, moderate energy, and controllable hygroscopicity.

Although the gas generant compositions of the invention can function as either the main gas generant or the enhancer charge in a pyrotechnic inflator, the functions of these charges differ, which dictates differences in the formulation of the composition used for each charge.

To meet representative toxicity requirements, the sum of the charges in a vehicle air bag inflator must approach a near stoichiometric balance of oxidizer and fuel. For practical systems, the oxygen balance of the system must be within about 4 percent of the theoretical stoichiometric balance, or the gases produced will contain too much CO or $NO_x$, depending on whether excess fuel or excess oxidizer is present. However, as long as the entire system is close to a stoichiometric balance, and any divergence in the main charge is compensated for by an opposite divergence in the enhancer, the individual charges need not be in stoichiometric balance. For example, the main gas generant charge can be fuel rich if the enhancer charge is oxidizer rich, and the entire system is within about 4 percent of a stoichiometric balance. In general, however, having all charges in stoichiometric balance provides a lower level of toxic compounds in the inflator effluent gases. In light of these requirements for temperature, stoichiometry, and solids production, guanidine nitrate and nitroguanidine are preferred fuels. These fuels produce less than about 18 percent solids with the oxidizers listed above, and can produce significantly less than 18 percent solids when used with certain oxidizer combinations discussed above, such as ammonium perchlorate/sodium nitrate. Preferred, non-limiting guanidine nitrate and nitroguanidine based main charge gas generants that meet the requirements discussed above are listed below.

Guanidine Nitrate/Ammonium Nitrate (phase stabilized)
49.4% Guanidine Nitrate
38.8% Ammonium Nitrate
11.2% Potassium Perchlorate (Phase stabilizer for AN)
0.6% Sub-micron Fumed Silica
Guanidine Nitrate/Ammonium Nitrate (phase stabilized)
45.5% Guanidine Nitrate
49.0% Ammonium Nitrate
5.5% Potassium Nitrate (Phase stabilizer for AN)
Guanidine Nitrate/Ammonium Perchlorate/Sodium Nitrate
58.5% Guanidine Nitrate
23.5% Ammonium Perchlorate
17.8% Sodium Nitrate
0.2% Sub-micron Fumed Silica
Guanidine Nitrate/Ammonium Perchlorate/Lithium Carbonate
47.4% Guanidine Nitrate
39.5% Ammonium Perchlorate
13.1% Lithium Carbonate
Guanidine Nitrate/Ammonium Perchlorate/Lithium Nitrate
60.6% Guanidine Nitrate
24.3% Ammonium Perchlorate
14.9% Lithium Nitrate
0.2% Sub-micron Fumed Silica
Guanidine Nitrate/Ammonium Perchlorate/Potassium Nitrate
56.7% Guanidine Nitrate
22.8% Ammonium Perchlorate
20.5% Potassium Nitrate
Guanidine Nitrate/Ceric Ammonium Nitrate
56.5% Guanidine Nitrate
43.5% Ceric Ammonium Nitrate
Guanidine Nitrate/Lithium Nitrate
67.4% Guanidine Nitrate
32.3% Lithium Nitrate
0.3% Sub-micron Fumed Silica
Guanidine Nitrate/Lithium Perchlorate
68.2% Guanidine Nitrate
31.5% Lithium Perchlorate
0.3% Sub-micron Fumed Silica
Nitroguanidine/Ammonium Perchlorate/Lithium Carbonate
43.6% Nitroguanidine
42.4% Ammonium Perchlorate
14.0% Lithium Carbonate
Nitroguanidine/Ceric Ammonium Nitrate
52.8% Nitroguanidine
47.2% Ceric Ammonium Nitrate Sub-micron fumed silica, such as Cabosil®, a product of Cabot Corporation of Tuscola, Ill., is typically added to compositions containing a hygroscopic ingredient. Cabosil® and similar very fine, sub-micron particle size, high surface area fumed silicas, minimize contamination by moisture, and act as a flow aid when the compositions are in a powdered form prior to pressing into grains or pellets.

Some of the fuels of the invention do not possess very good binding characteristics, and, thus, may require a binder for the formation of pellets, grains, or granules.

With the exception of the guanidine nitrate/ammonium nitrate/potassium perchlorate composition, which is stoichiometrically balanced, the preferred compositions, listed above, all contain sufficient oxidizer to produce a 1 percent by mass excess of oxygen. However, as noted above, a greater variation from stoichiometric balance is acceptable, as long as the oxygen balance is within about 4 percent of the theoretical stoichiometric balance.

When critical factors, such as hygroscopicity, flame temperature, mechanical stability of propellant grains, and minimum solids production, are considered, the most preferred main gas generant propellants is the guanidine nitrate/ammonium perchlorate/sodium nitrate ("GN/AP/SN") composition set forth above. This composition provides good ballistic performance when pressed into aspirin sized tablets, and, if properly implemented in a vehicle air bag inflator, so that significant condensation of solids occurs in the inflator, does not require an inflator filter. Tablets comprising the GN/AP/SN composition have good mechanical strength and stability following thermal cycling. The GN/AP/SN propellant is relatively non-hygroscopic, and is readily produced under reasonable temperature and humidity conditions.

In a typical inflator, the main gas generant charge is ignited by the combustion of the enhancer charge, and both charges produce the hot gas necessary to pressurize the inflator and fill the air bag. The enhancer charge should be readily ignited by a standard initiator, even at low ambient temperatures, and should burn hot. The flame temperature should be at least as hot as those produced by the main gas generant charge, and preferably hotter. In a typical inflator, the mass of the enhancer charge is much less than that of the main gas generant charge. Accordingly, the percentage of solids produced by combustion of the enhancer charge can be higher than that of the main gas generant charge. In practice, the solids production of an enhancer charge should be less than about 50 percent, but is preferably less than about 20 percent.

As with the main propellant charge, the enhancer propellant should be close to a stoichiometric balance for oxidizer and fuel to meet the gas toxicity requirements for vehicle air bag inflators. However, a stoichiometric balance is not as critical for the enhancer propellant compared to the main gas generant because the output of the enhancer is small in comparison to the total inflator output.

The preferred enhancer charge fuels are guanidine nitrate with RDX or HMX as an energizing agent, nitroguanidine, cellulose, cellulose acetate, and hexamine. An energizing agent, as used herein, refers to fuels which can be added to the compositions of the invention to increase flame temperature, and, potentially, increase burn rate and improve igniteability. Preferred, non-limiting enhancer charge compositions are listed below.

Guanidine Nitrate/RDX and/or HMX/Ammonium Perchlorate/Sodium Nitrate
- 30.0% Guanidine Nitrate
- 32.3% RDX and/or HMX
- 21.3% Ammonium Perchlorate
- 16.2% Sodium Nitrate
- 0.2% Sub-micron fumed silica.

Nitroguanidine/Ammonium Perchlorate/Sodium Nitrate
- 54.8% Nitroguanidine
- 25.6% Ammonium Perchlorate
- 19.4% Sodium Nitrate
- 0.2% Sub-micron fumed silica.

Nitroguanidine/Lithium Perchlorate
- 64.8% Nitroguanidine
- 34.8% Lithium Perchlorate
- 0.4% Sub-micron fumed silica.

Cellulose/Ammonium Perchlorate/Sodium Nitrate
- 24.4% Cellulose
- 42.8% Ammonium Perchlorate
- 32.5% Sodium Nitrate
- 0.3% Sub-micron fumed silica.

Cellulose Acetate/Ammonium Perchlorate/Sodium Nitrate
- 22.4% Cellulose Acetate
- 43.9% Ammonium Perchlorate
- 33.4% Sodium Nitrate
- 0.3% Sub-micron fumed silica.

Hexamine/Ammonium Perchlorate/Sodium Nitrate
- 15.7% Hexamine
- 47.7% Ammonium Perchlorate
- 36.2% Sodium Nitrate
- 0.4% Sub-micron fumed silica.

Preferably, the same components are used in the enhancer and main gas generant charges. For guanidine nitrate, RDX or HMX can be added to enhance the burn rate and combustion temperature of the propellant. The most preferred enhancer charges comprise the most preferred main gas generant charge compositions described above with a portion of the fuel replaced with either RDX or HMX. The preferred amount of RDX or HMX is about 15 to about 45 percent by weight, most preferably about 32 percent. To maintain a propellant that is in a near stoichiometric balance, the percentage of oxidizer must be adjusted to compensate for the change in fuel composition. The most preferred enhancer charge composition is the guanidine nitrate composition listed above.

For nitroguanidine based gas generants, $NH_4ClO_4$/$NaNO_3$, $NH_4ClO_4$/$LiNO_3$, and $NH_4ClO_4$/$KNO_3$ or $LiClO_4$ oxidizers typically do not require an energizing agent, such as RDX or HMX, because these compositions burn at a sufficiently high temperature.

The preferred enhancer compositions have a near stoichiometrically balanced oxidizer/fuel ratio. When used in a filterless driver side vehicle inflator, the preferred enhancer compositions are used in the form of granules.

The following non-limiting example is merely illustrative of the preferred embodiments of the present invention, and is not to be construed as limiting the invention, the scope of which is defined by the appended claims.

EXAMPLE

A filterless, driver side air bag inflator was assembled using the enhancer and gas generant charges according to the invention. A main gas generant charge was formed by mixing 58.5 percent guanidine nitrate, 23.5 percent ammonium perchlorate, and 17.8 percent sodium nitrate, with 0.2 percent sub-micron fumed silica, and pressing the mixture into pellets having a density of about 1.6 to 1.65 g/cc. Twenty one grams of these pellets were then loaded into the main charge cup of the inflator.

The enhancer charge was prepared by pressing 32.3 percent RDX, 30.0 percent guanidine nitrate, 21.3 percent ammonium perchlorate, 16.2 percent sodium nitrate, and 0.2 percent sub-micron fumed silica into 1.3 to 2.5 cm diameter pellets or slugs having a thickness of about 0.5 cm and a density of about 1.6 to 1.7 g/cc. The slugs were then granulated and sieved to produce granules of the enhancer. The required quantity of the granules were loaded into the enhancer cup assembly of the inflator.

The inflator was equipped with a standard automotive air bag initiator, containing a zirconium/potassium perchlorate charge. The inflator was also equipped with an autoignition material, having an autoignition temperature of about 150°±5° C.

When initiated by the air bag initiator, the enhancer and main gas generant charges rapidly generate substantially pure, non-toxic gases without any harmful side products at a temperature that is not harmful to vehicle occupants. A 60 liter closed tank performance test was performed with the inflator described above. In this test, the gas generated on initiation was exhausted into a closed 60 liter tank. At temperatures ranging from −30° C. to 80° C., the inflator produced pressures in the tank in excess of 200 kPa in less than 30 ms. A graph of these results is presented in FIG. 1.

Generally, any size vehicle air bag can be inflated in the requisite time by employing sufficient amounts of enhancer and main generant charges, where the ratio of the volume of the air bag and the required amount of gas generant is approximately constant.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

We claim:

1. A low-solids gas generating composition, comprising a mixture of a fuel selected for the group consisting of guanidine nitrate, nitroguanidine, and mixtures thereof, and an oxidizer selected from the group consisting of ceric ammonium nitrate, lithium nitrate, lithium perchlorate, sodium perchlorate, a mixture of ammonium perchlorate and at least one alkali metal salt, and mixtures thereof, wherein the oxidizer-fuel mixture is within about 4 percent of stoichiometric balance, and produces no more than about 30 percent solids on combustion.

2. The gas generating composition of claim 1, wherein the alkali metal salt is selected from the group consisting of lithium carbonate, lithium nitrate, sodium nitrate, potassium nitrate, and mixtures thereof.

3. The gas generating composition of claim 2, further comprising sub-micron fumed silica.

4. The gas generating composition of claim 2, wherein the fuel further comprises at least one of cellulose, cellulose acetate or hexamine.

5. The gas generating composition of claim 2, wherein the gas generant is in the form of pressed pellets, grains, or granules.

6. The gas generating composition of claim 1, further comprising an energizing agent.

7. The gas generating composition of claim 6, wherein the energizing agent is selected from the group consisting of RDX and HMX.

8. The gas generating composition of claim 7, comprising guanidine nitrate, RDX, HMX, or mixtures thereof and an oxidizer comprising a mixture of ammonium perchlorate and sodium nitrate.

9. The gas generating composition of claim 8, comprising from about 12 to about 52 percent by weight guanidine nitrate, from about 15 to about 45 percent by weight RDX, HMX, or mixtures thereof and from about 31 to about 45 percent by weight oxidizer, wherein the oxidizer comprises ammonium perchlorate and sodium nitrate in a mole ratio of about 1 mole of ammonium perchlorate to about 1 to about 4 moles of sodium nitrate.

10. The gas generating composition of claim 9, comprising about 30 percent by weight guanidine nitrate, about 32 percent by weight RDX, HMX, or mixtures thereof, about 21 percent by weight ammonium perchlorate, and about 17 percent by weight sodium nitrate.

11. The gas generating composition of claim 1, comprising guanidine nitrate and an oxidizer comprising a mixture of ammonium perchlorate and sodium nitrate.

12. The gas generating composition of claim 11, comprising from about 54 to about 67 percent by weight guanidine nitrate and from about 33 to about 46 percent by weight oxidizer, wherein the oxidizer comprises ammonium perchlorate and sodium nitrate in a mole ratio of about 1 mole of ammonium perchlorate to about 1 to about 4 moles of sodium nitrate.

13. The gas generating composition of claim 12, comprising about 59 percent by weight guanidine nitrate, about 23 percent by weight ammonium perchlorate, and about 18 percent by weight sodium nitrate.

14. The gas generating composition of claim 1, comprising guanidine nitrate and an oxidizer comprising a mixture of ammonium perchlorate and lithium carbonate.

15. The gas generating composition of claim 14, comprising from about 41 to about 57 percent by weight guanidine nitrate and from about 43 to about 59 percent by weight oxidizer, wherein the oxidizer comprises ammonium perchlorate and lithium carbonate in a mole ratio of about 1 mole of ammonium perchlorate to about 1 to about 1.4 moles of lithium carbonate.

16. The gas generating composition of claim 15, comprising about 47 percent by weight guanidine nitrate, about 40 percent by weight ammonium perchlorate, and about 13 percent by weight lithium carbonate.

17. The gas generating composition of claim 1, comprising guanidine nitrate and an oxidizer comprising a mixture of ammonium perchlorate and lithium nitrate.

18. The gas generating composition of claim 17, comprising from about 56 to about 68 percent by weight guanidine nitrate and from about 32 to about 44 percent by weight oxidizer, wherein the oxidizer comprises ammonium perchlorate and lithium nitrate in a mole ratio of about 1 mole of ammonium perchlorate to about 1 to about 8 moles of lithium nitrate.

19. The gas generating composition of claim 18, comprising about 61 percent by weight guanidine nitrate, about 24 percent by weight ammonium perchlorate, and about 15 percent by weight lithium nitrate.

20. The gas generating composition of claim 1, comprising guanidine nitrate and an oxidizer comprising a mixture of ammonium perchlorate and potassium nitrate.

21. The gas generating composition of claim 20, comprising from about 50 to about 64 percent by weight guanidine nitrate and from about 36 to about 50 percent by weight oxidizer, wherein the oxidizer comprises ammonium perchlorate and potassium nitrate in a mole ratio of about 1 mole of ammonium perchlorate to about 1 to about 2 moles of potassium nitrate.

22. The gas generating composition of claim 21, comprising about 57 percent by weight guanidine nitrate, about 23 percent by weight ammonium perchlorate, and about 20 percent by weight potassium nitrate.

23. The gas generating composition of claim 1, comprising guanidine nitrate and ceric ammonium nitrate.

24. The gas generating composition of claim 23, comprising from about 51 to about 65 percent by weight guanidine nitrate and from about 35 to about 49 percent by weight ceric ammonium nitrate.

25. The gas generating composition of claim 24, comprising about 56 percent by weight guanidine nitrate and about 44 percent by weight ceric ammonium nitrate.

26. The gas generating composition of claim 1, comprising guanidine nitrate and lithium nitrate.

27. The gas generating composition of claim 20, comprising from about 61 to about 70 percent by weight guanidine nitrate and from about 30 to about 39 percent by weight lithium nitrate.

28. The gas generating composition of claim 27, comprising about 68 percent by weight guanidine nitrate and about 32 percent by weight lithium nitrate.

29. The gas generating composition of claim 1, comprising guanidine nitrate and lithium perchlorate.

30. The gas generating composition of claim 29, comprising from about 65 to about 75 percent by weight guanidine nitrate and from about 25 to about 35 percent by weight lithium perchlorate.

31. The gas generating composition of claim 30, comprising about 68 percent by weight guanidine nitrate and about 32 percent by weight lithium perchlorate.

32. The gas generating composition of claim 1, comprising nitroguanidine and an oxidizer comprising a mixture of ammonium perchlorate and lithium carbonate.

33. The gas generating composition of claim 32, comprising from about 38 to about 53 percent by weight nitroguanidine and from about 47 to about 62 percent by weight oxidizer, wherein the oxidizer comprises ammonium perchlorate and lithium carbonate in a mole ratio of about 1 mole of ammonium perchlorate to about 1 to about 1.3 moles of lithium carbonate.

34. The gas generating composition of claim 33, comprising about 44 percent by weight nitroguanidine, about 42 percent by weight ammonium perchlorate, and about 14 percent by weight lithium carbonate.

35. The gas generating composition of claim 1, comprising nitroguanidine and an oxidizer comprising a mixture of ammonium perchlorate and sodium nitrate.

36. The gas generating composition of claim 35, comprising from about 50 to about 62 percent by weight nitroguanidine, and from about 38 to about 50 percent by weight oxidizer, wherein the oxidizer comprises ammonium perchlorate and sodium nitrate in a mole ratio of about 1 mole of ammonium perchlorate to about 1 to about 3 moles of sodium nitrate.

37. The gas generating composition of claim 36, comprising about 55 percent by weight nitroguanidine, about 26 percent by weight ammonium perchlorate, and about 19 percent by weight sodium nitrate.

38. The gas generating composition of claim 1, comprising nitroguanidine and lithium perchlorate.

39. The gas generating composition of claim 38, comprising from about 62 to about 71 percent by weight nitroguanidine, and from about 29 to about 38 percent by weight lithium perchlorate.

40. The gas generating composition of claim 39 comprising about 65 percent by weight nitroguanidine and about 35 percent by weight lithium perchlorate.

41. The gas generating composition of claim 1, comprising nitroguanidine and ceric ammonium nitrate.

42. The gas generating composition of claim 41, comprising from about 48 to about 61 percent by weight nitroguanidine and from about 39 to about 52 percent by weight ceric ammonium nitrate.

43. The gas generating composition of claim 42, comprising about 53 percent by weight nitroguanidine and about 47 percent by weight ceric ammonium nitrate.

* * * * *